United States Patent [19]

Rossi et al.

[11] 4,025,762
[45] May 24, 1977

[54] REFERENCE SIGNAL CIRCUIT

[75] Inventors: Anthony J. Rossi, Fitchburg; Donald F. Behringer, Ashburnham, both of Mass.

[73] Assignee: General Electric Company, Schenectady, N.Y.

[22] Filed: Nov. 21, 1975

[21] Appl. No.: 634,138

[52] U.S. Cl. .................. 235/150.1; 235/153 A; 318/563
[51] Int. Cl.² .................................. G05B 9/03
[58] Field of Search .............. 318/591, 563, 564; 235/150.1, 153 AE

[56] References Cited
UNITED STATES PATENTS

| 3,444,528 | 5/1969 | Lovell et al. | 235/153 AE X |
| 3,578,958 | 5/1971 | Richardson | 235/153 AE X |
| 3,940,594 | 2/1976 | Bleak et al. | 235/150.1 |

*Primary Examiner*—Eugene G. Botz
*Attorney, Agent, or Firm*—James W. Mitchell; John F. Ahern

[57] ABSTRACT

In a prime mover control system, control over the prime mover is dependent, in part, upon the validity of a reference signal to the control system. Circuitry is provided between a reference signal generator and the control system whereby under normal conditions the reference signal to the control system is the same as the output of the reference signal generator. However, if the reference signal generator output becomes invalid, then a stored reference signal may be substituted for the reference signal generator output by switching from a first signal channel to an alternate second signal channel, each channel selectably interconnecting the reference signal generator and the control system. The output of the second signal channel is periodically updated to follow, with a time lag, the reference signal generator output except when an invalid reference signal generator output is detected whereupon the update of the second signal channel is frozen at a last valid reference signal which is then input into the control system.

9 Claims, 2 Drawing Figures

REFERENCE SIGNAL CIRCUIT

BACKGROUND OF THE INVENTION

The present invention relates, in general, to control systems; and in particular, to circuitry for interconnecting a reference signal generator to a control system.

In a control system, a reference signal sets the desired performance of the controlled vehicle. The control system will follow the reference signal. If the reference signal becomes invalid, then the control system itself will become invalid. One type of control system is a closed loop control system for a prime mover, for example, a steam turbine. In a steam turbine control system, a reference signal to the control system is compared with a feedback signal from the turbine to generate an error signal which is then used to adjust the steam admission valves until the feedback signal matches the reference signal. The reference signal is provided by a reference signal generator which may, for example, be a computer. The output of the reference signal generator is dependent upon the input information it receives and the proper functioning of the reference signal generator itself. If the input information is invalid or the reference signal generator itself fails, then it is possible to have a catastrophic failure of the reference signal generator output. The foregoing mode of failure may not affect, too adversely, the controlled vehicle; but it is possible that such a failure will greatly affect, in an adverse manner, equipment which interfaces with the controlled vehicle. For example, a boiler feed pump turbine supplies feedwater to a boiler. The turbine itself includes overspeed protection and will not be too adversely affected by shutdown or overspeed trip. However, the boiler which interfaces with the turbine through a boiler feed pump may be subject to excessive or insufficient feedwater supply with damaging consequences.

It is clear, therefore, that one object of the present invention is to discontinue an invalid reference signal generator output to the control system.

If the reference signal generator output to the control system is discontinued, then an alternate reference signal to control system may be provided. This alternate signal can be provided by switching to a manually adjustable input reference signal. However, a problem arises in the selection of an appropriate set point for the manually adjustable reference signal which must be at or near the last valid output of the reference signal generator.

It is therefore another object of the present invention to provide an automatic alternate reference signal which is at the last valid output of the reference signal generator.

It is a combined objective of the present invention to provide a reference signal to a control system which will follow a reference signal generator output which is valid; and, which will provide an alternate last valid reference signal for an invalid reference generator output when the invalid reference generator output is detected.

It is a further objective of the present invention to hold the control system at the last valid reference signal indefinitely until the reference signal generator malfunction is correct or until manual control may be asserted at the last valid input reference signal level.

While the foregoing has been illustratively described in terms of a closed loop control system for a prime mover, it is not intended to limit the application of the present invention thereto.

The novel features believed characteristic of the present invention are set forth in the appended claims. The invention itself, however, together with further objects and advantages thereof, may best be understood with reference to the following description, taken in connection with the drawings.

BRIEF DESCRIPTION OF THE INVENTION

A reference signal circuit has an input end connected to a reference signal generator and an output end connected to a control system whereby the control system may follow the reference signal generator through the reference signal circuit. The reference signal circuit has a first channel selectably interconnecting the reference signal circuit input end with the reference signal circuit output end whereby the output end immediately follows the input end and hence the reference signal generator. A second alternate signal channel is provided selectably interconnecting the reference signal circuit input end with the reference signal circuit output end, said second signal channel having a memory function incorporated therein. The memory function includes signal storage means having a signal update means whereby the reference signal circuit input is sampled on a storage input update signal and then transferred, after a time delay, to the signal storage means output on a storage output update signal. Switching means are provided for selectably connecting either the first signal channel to the reference signal circuit output end when the reference signal circuit input end is valid; or, the second signal channel to the reference signal circuit output end when the reference signal circuit input end is valid. Switching to the second channel freezes the signal storage means whereby the output end of the reference signal circuit will follow the signal storage means output which is frozen at the last valid reference generator output to the input end of the reference signal circuit.

DETAILED DESCRIPTION OF THE INVENTION

Figure 1:
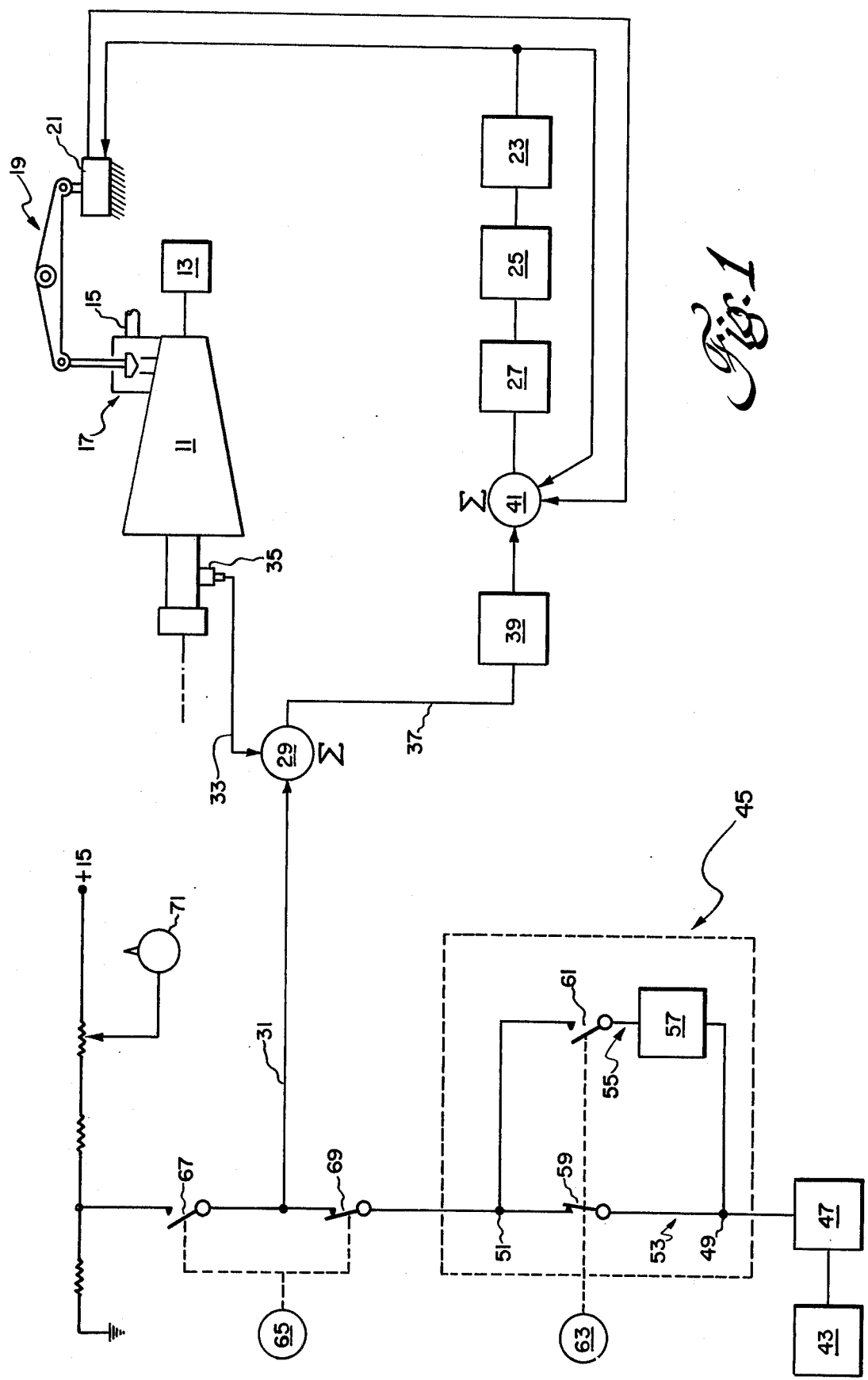
FIG. 1 is a schematic representation of a turbine having a control system provided therefor and a reference signal circuit according to the present invention interconnected between a reference signal generator and the control system.

Referring to FIG. 1, a prime mover 11 such as a steam turbine drives a load 13 which may, for example, be a feedwater pump. Steam produced in a steam generator (not shown) is input into the steam turbine through a steam inlet conduit 15 connected to a valve chest 17. Steam admission is controlled by a valve gear 19 which is positioned by a valve operator 21. The valve operator provides a mechanical output in accordance with a hydraulic input signal from a hydraulic amplifier 23. The hydraulic amplifier output signal is determined by an input signal from a servo-valve mechanism 25 which, in turn, is controlled by an input signal from an electrical power amplifier 27.

A reference signal is provided to the control system at a first summing junction 29 through line 31. According to the illustrative showing of one application of the present invention, the signal on line 31 represents a desired speed set point for the turbine control system being described. A feedback signal on line 33 is also input into the first summing junction. The feedback signal on line 33 represents the actual speed of the turbine which may be derived from a speed pick-up transducer 35 located adjacent the turbine shaft. The reference speed input and the feedback speed input are algebraically added in the first summing junction to output a speed error signal on line 37. The speed error signal is a valve position adjustment signal in accordance with the speed error and is input into an amplifier circuit 39 for signal stabilization and range adjustment. The output from amplifier 39 is input into a second summing junction 41 wherein it is algebraically added to position feedback signals from the hydraulic amplifier and valve operator respectively. The foregoing control system is illustrative of one known prior art control system. Further illustrative of such control systems is U.S. Pat. No. 3,097,488 issued July 16, 1963 to Eggenberger et al, incorporated herein by reference. Also, U.S. Pat. application 526,906, now U.S. Pat. No. 3,986,788, filed Nov. 25, 1974 in the name of Anthony J. Rossi, shows another example of a turbine control system in which the present invention may be utilized and which is incorporated herein by reference.

The reference signal on line 31 may be supplied from a reference signal generator 43 through a reference signal circuit 45 according to the present invention. The reference signal generator may be any type of automatic information processing device or computer which receives input information (not shown) related to an operating condition of some interfacing equipment, e.g., a boiler, and which is programmed to produce an output signal representative of a desired speed for the turbine in accordance with the input information. The reference signal generator output may be modified if necessary through a signal conditioner circuit 47 interconnecting the reference signal generator to the input end 49 of the reference signal circuit. The signal conditioner circuit is generally a buffer circuit comprising one or more operational amplifiers which condition the output of the reference signal generator so that it will be compatible with the electronics of the control system.

The signal output from the reference signal generator (through the signal conditioner) is input into the reference signal circuit 45. The reference signal circuit is connected at an output end 51 to the control system in a manner to be described. The output end and the input end of the reference signal circuit are interconnected by a first signal channel 53 and a second alternate signal channel 55, the second signal channel including a memory function 57. The first and second signal channels are selectably connected to the output end 51.

Selection of either the first signal channel or the second alternate channel to the reference signal circuit output end 51 is accomplished through a switching means comprising switch 59 (first channel) or switch 61 (second channel) and relay 63. Switches 59 and 61 are ganged so that when one switch is closed, the other switch must be opened. Relay 63 is also connected to the memory function in a manner to be described. The switching means functions as follows. If the input end signal to the reference signal circuit is valid, then switch 59 is closed and switch 61 is open, whereby the output end of the reference signal circuit follows the input end through the first channel 53. If the signal at the input end of the reference signal circuit is detected to be invalid, switch 59 is opened and swtich 61 is closed thereby connecting the second alternate channel to the output end of the reference signal circuit whereby the output end follows the output of the signal memory function 57. Moreover, relay 63 also acts to freeze the output of the signal memory function.

Means are also provided for asserting a manually adjustable reference signal in place of the output end signal of the reference signal circuit. Such means include a manually adjustable reference signal source 71 which is input into the control system through switch 67 (which closed) whereas switch 69 (when open) will "lock out" the output end signal of the reference signal circuit. Switches 67 and 69 are ganged together so that when switch 67 is open switch 69 is closed and vice-versa. Switches 67 and 69 are actuated through a relay 65.

Figure 2:
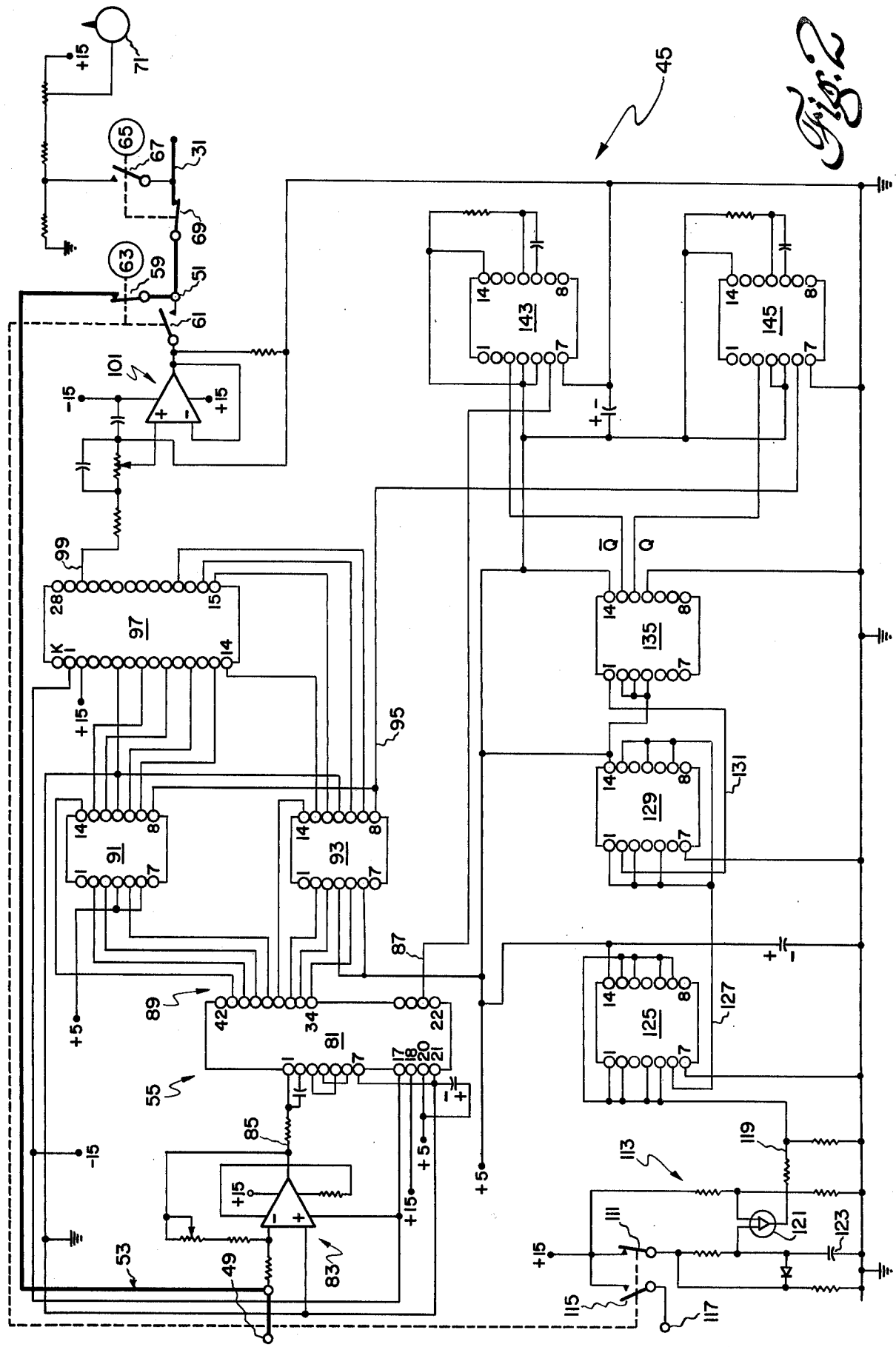
FIG. 2 is a circuit diagram of the reference signal circuit.

Referring now to FIG. 2, the output signal from the signal conditioner circuit 47 (FIG. 1) and hence the reference signal generator is input into the reference signal circuit at input end 49. The reference signal at input end 49 is sent in parallel through the first signal channel 53 and the second signal channel 55. The respective outputs of the first and second signal channels are selectably applied to the output end 51 of the reference signal circuit as previously described. Thus, if the reference generator output is valid, switch 59 will be closed and output end 51 will follow the input end 49 of the reference signal circuit through the first signal channel 53. The signal input at node 49 (input end) will be the same as the reference signal generator output with appropriate modification by the signal conditioner circuit (47, FIG. 1).

The second alternate signal channel 55 comprises a memory function including a signal storage means and a signal update means.

The signal storage means includes an analog-to-digital converter 81 of the type which has a counter therein and a binary output. An input inverter circuit 83 interconnects the input end of the reference signal circuit with the analog-to-digital converter 81. A suitable analog-to-digital converter is available from Analog Devices Incorporated of Norwood, Mass. under the model number ADC-8S. Hence, the output of buffer circuit 83 on line 85 is input into the converter 81 whereupon it is counted and stored whenever the converter 81 receives an input update signal on line 87. The converter counter has an 8-bit output 89 which is immediately stored in a shift register. While 8-bit shift registers are available, it has been found convenient to use two 4-bit shift registers 91 and 93. Such a device is available from Texas Instruments, Inc. of Dallas, Tex. identified as an SN74L95, 4-Bit parallel Access Shift Register. The input update information is supplied to the shift registers upon the occurrence of the input update signal. The shift registers are also a part of the signal storage means.

After an adjustable time delay which may be on the order of milliseconds or seconds depending upon the amount of time needed to detect a catastrophic failure of the reference signal generator output to the input end of the reference signal circuit, an output update signal is input into the shift registers on line 95. This causes the information stored on the input side of the shift register to be transferred to the output side of the shift register whereupon it is input into a digital-to-analog converter 97. The digital-to-analog converter receives the binary output from the shift registers upon the occurrence of an output update signal and converts it into an analog output on line 99. A suitable digital-to-analog converter is available from Analog Devices Incorporated of Norwood, Mass. under the model designation of DAC-10Z. The output of the digital-to-analog converter on line 99 is input into an output buffer circuit 101 whereupon the output of the shift register (signal storage means) is selectably available as the output of the second alternate channel.

A signal update means provides an input update signal and an output update signal in sequence with a time lag (delay) therebetween. Under normal operation, that is, a valid reference generator output is available, switch 59 is normally closed to connect the first signal channel as the reference signal circuit output at 51. Under this condition, switch 111 controlled by relay 63 is also closed to provide a voltage supply to a clock 113. Switch 115 is ganged with switch 111 so that switch 115 connected to an alarm 117 is normally open. The voltage supply through switch 111 causes a pulsed output from clock 113 on line 119 due to circuitry comprising a programable unijunction transistor 121 and capacitor 123. The pulsed output on line 119 is a spike with decay which is transformed into a square wave output in Schmitt-Trigger 125 on line 127. A suitable Schmitt-Trigger device is available from Texas Instruments, Inc. of Dallas, Tex. under the model number SN7413.

The square wave output on line 127 is inverted in an inverter device 129 having output on line 131. A suitable inverter device is available from Texas Instruments, Inc. of Dallas, Tex. under the model number SN7404.

The pulsed output from the inverter is input into a phase shift device comprising a J-K flip-flop 135 having two outputs $\overline{Q}$ and Q. As the input on line 131 goes from high to low there will be alternate $\overline{Q}$ and Q outputs with a time delay equal to twice the period between the high-low pulses on line 131. The $\overline{Q}$ output is the input update signal and the Q output is the output update signal which are input respectively into monostable multivibrators 143 and 145 connected to the analog-to-digital converter 81, line 87 and the shift registers 91, 93, line 95. The respective multivibrator outputs are triggering voltages.

If the voltage supply to clock 113 is interrupted by opening switch 111 through relay 63, then the pulsed output of inverter 129 to the J-K flip-flop 135 will cease causing the output of the J-K flip-flop to be frozen between the $\overline{Q}$ and Q outputs; i.e., between the input update signal and the output update signal. The signal update means comprises a clock, a J-K flip-flop and a pair of multivibrators in order to produce an input update signal and an output date signal.

The operation of the present invention is as follows. The reference signal circuit includes an input end and an output end selectably interconnected by a first signal channel and an alternate second signal channel, the second signal channel including a memory function. The reference signal generator output is received at the input end of the reference signal circuit whereas the output end of the reference signal circuit is input into the control system when switch 69 is closed to provide an automatic signal. Each signal channel is selectably connected to the output end of the reference signal circuit. When the reference signal generator output is valid switches 59 and 111 are closed while switch 61 is open. Under this condition, the output end of the reference signal circuit follows the input end of the reference signal circuit through the first signal channel. Meanwhile, the second signal channel output is updated in the following manner. Clock 113 provides a timed output through J-K flip-flop 135 comprising $\overline{Q}$ (input update signal) and Q (output update signal) to the input side of the signal storage means and the output side of the signal storage means. On the $\overline{Q}$ signal, the shift register stores a first signal while the output side remains quiet. On a Q signal, the shift register transfers the first signal to the output side of the signal storage means. On the next $\overline{Q}$ signal, the shift register stores a second signal while the output side remains at the first signal. If there is no Q signal following, due to the opening of switch 111, then the output side of the signal storage means remains at the first signal. Hence, if an invalid signal is detected, then relay 63 is used to interrupt the clock and connect the output side of the signal storage means to the output end of the reference signal circuit whereby the output end follows the last output of the signal storage means which is frozen. The elapsed time between the $\overline{Q}$ and Q signals is time adjustable.

The determination with respect to the reference signal generator output validity is not within the scope of the present invention since signal validity will depend upon the system in which the reference signal circuit is employed. Obviously, signal validity may be determined by an operator who could apply a malfunction signal to relay 63. However, state of the art electronics are available for determining signal invalidity within a millisecond interval and hence the time delay between the $\overline{Q}$ and Q signal can be determined.

While there is shown what is considered, at present, to be the preferred embodiment of the invention, it is, of course, understood that various other modifications may be made therein. It is intended to claim all such modifications as fall within the true spirit and scope of the invention.

What is claimed is:

1. In a prime mover control system, a reference signal is input into the control system through a reference signal circuit, the reference signal circuit including a signal storage means; the reference signal circuit having an input end connected to a reference signal generator and an output end connected to the control system; the output end following the input end except when the input end becomes invalid whereupon the output end follows the signal storage means, the reference signal circuit comprising:
   a first signal channel connected to the input end of the reference signal circuit;
   a second alternate signal channel, including the signal storage means, connected to the input end of the reference signal circuit;
   signal update means connected to the signal storage means for providing a storage input update signal and a storage output update signal, the input update signal and the output update signal having a time lag therebetween; and,
   switching means connected to the first and second channels and to the signal update means; the switching means connecting the first channel to the reference signal circuit output end except when the input end becomes invalid whereupon the switching means connects the second channel to the reference signal circuit output end and interrupts the signal update means whereby the reference signal circuit output end follows the last output of the signal storage means.

2. The circuit recited in claim 1 wherein the signal storage means comprises:
 a digital counter connected to the input end of the reference signal circuit and actuated by the storage input update signal; and,
 a digital shift register connected to the output of the digital counter and actuated by the storage output update signal whereby information stored on the input of the shift register is transferred to the output of the shift register.

3. The circuit recited in claim 2 wherein the signal storage means further includes an analog to digital converter in combination with said digital counter.

4. The circuit recited in claim 1 wherein said signal update means comprise:
 clock means providing a pulse train output;
 phase shifter means connected to the clock means providing $\overline{Q}$ and Q outputs;
 a first monostable multivibrator connected to the $\overline{Q}$ output for providing an input update signal; and,
 a second monostable multivibrator connected to the Q output for providing an output update signal.

5. The circuit recited in claim 4 wherein the phase shifter means is a J-K flip-flop.

6. The circuit recited in claim 1 wherein said switching means comprise:
 a first switch interconnecting the first channel with the reference signal circuit output end;
 a second switch interconnecting the second channel with the reference signal circuit output end;
 a third switch interconnecting the signal update means with a voltage source;
 relay means associated with the switches for selectively closing the first and third switches and opening the second switch and for opening the first and third switches and closing the second switch.

7. A reference signal circuit for a control system, including a signal means, having an output end which follows an input end except when the input end becomes invalid whereupon the output end follows the signal storage means, the reference signal circuit comprising:
 a first signal channel connected to the input end of the reference signal circuit;
 a second alternate signal channel including the signal storage means connected to the input end of the reference signal circuit;
 signal update means connected to the signal storage means for providing a storage input update signal and a storage output update signal, the input update signal and the output update signal having a time lag therebetween; and,
 switching means connected to the first and second channels and to the signal update means; the switching means connecting the first signal channel to the reference signal circuit output end except when the input end becomes invalid whereupon the switching means connects the second channel to the memory circuit output end and interrupts the signal update means whereby the reference signal circuit output end follows the last output of the signal storage means.

8. A reference signal circuit having an input end and an output end, said circuit comprising:
 a first signal channel connected to the input end;
 a second alternate signal channel including a signal storage means connected to the input end;
 signal update means connected to the signal storage means for providing a storage input update signal and a storage output update signal, the storage output update signal lagging the storage input update signal;
 switching means for selectably connecting the first and second channels to said output end; said switching means having a first mode wherein the first channel is connected to the circuit output and a second mode wherein the second channel is connected to the circuit output whereby in the first mode the circuit output follows the circuit input and in the second mode the circuit output follows the signal storage means.

9. The circuit recited in claim 8 wherein said switching means is connected to said signal update means whereby in the second mode the signal update means is stopped and the signal storage means output becomes fixed.

* * * * *